United States Patent
Trego et al.

(10) Patent No.: US 11,085,478 B2
(45) Date of Patent: Aug. 10, 2021

(54) SUPPORT BEAM CONNECTOR SYSTEM

(71) Applicant: HNI Technologies Inc., Muscatine, IA (US)

(72) Inventors: Brian Trego, Muscatine, IA (US); Jacob Harvey, Muscatine, IA (US)

(73) Assignee: HNI Technologies Inc., Muscatine, IA (US)

( * ) Notice: Subject to any disclaimer, the term of this patent is extended or adjusted under 35 U.S.C. 154(b) by 0 days.

(21) Appl. No.: 16/003,915

(22) Filed: Jun. 8, 2018

(65) Prior Publication Data
US 2018/0355901 A1    Dec. 13, 2018

Related U.S. Application Data

(60) Provisional application No. 62/517,613, filed on Jun. 9, 2017.

(51) Int. Cl.
| | |
|---|---|
| *F16B 12/44* | (2006.01) |
| *E04B 1/41* | (2006.01) |
| *A47C 4/02* | (2006.01) |
| *B25H 1/02* | (2006.01) |
| *A47B 13/02* | (2006.01) |
| *F16M 11/16* | (2006.01) |
| *A47B 3/06* | (2006.01) |
| *A47C 11/00* | (2006.01) |
| *A47B 13/06* | (2006.01) |
| *E04B 1/38* | (2006.01) |

(52) U.S. Cl.
CPC ............ *F16B 12/44* (2013.01); *A47B 3/06* (2013.01); *A47B 13/02* (2013.01); *A47B 13/06* (2013.01); *A47C 4/02* (2013.01); *A47C 11/00* (2013.01); *B25H 1/02* (2013.01); *E04B 1/40* (2013.01); *F16M 11/16* (2013.01); *A47B 2200/0013* (2013.01); *A47B 2200/0014* (2013.01); *E04B 2001/405* (2013.01); *F16B 2012/443* (2013.01); *F16B 2012/446* (2013.01)

(58) Field of Classification Search
CPC ............... F16B 12/44; F16B 2012/446; F16B 2012/443; A47B 3/06; A47B 13/02; A47B 13/06; A47B 2200/0013; A47B 2200/0014; A47C 4/02; A47C 11/00; E04B 1/40; E04B 2001/405; F16M 11/16; B25H 1/02
USPC ......................................................... 248/188
See application file for complete search history.

(56) References Cited

U.S. PATENT DOCUMENTS

| | | | | |
|---|---|---|---|---|
| 1,286,376 | A * | 12/1918 | Madsen | A24F 19/0092 248/223.31 |
| 3,037,593 | A * | 6/1962 | Webster | E04B 2/7425 52/476 |
| 4,900,090 | A * | 2/1990 | Davis | A47C 5/12 297/440.1 |
| 5,577,856 | A * | 11/1996 | Tezuka | E04B 1/2604 403/294 |
| 8,905,670 | B1 * | 12/2014 | Blakeman | F16B 12/26 403/381 |

(Continued)

*Primary Examiner* — Christopher Garft
(74) *Attorney, Agent, or Firm* — Faegre Drinker Biddle & Reath LLP

(57) ABSTRACT

Various aspects of the present disclosure are directed toward apparatuses, systems and methods for connecting a first support and a second support. The apparatuses, systems and methods may include a first bracket arranged on the first support and a second bracket arranged on the second support to connect the first support and the second support.

17 Claims, 22 Drawing Sheets

(56) References Cited

U.S. PATENT DOCUMENTS

| | | | |
|---|---|---|---|
| 9,045,197 B2* | 6/2015 | Chen | F16B 35/041 |
| 2014/0261103 A1* | 9/2014 | Kelly | B65D 19/0006 |
| | | | 108/57.28 |

* cited by examiner

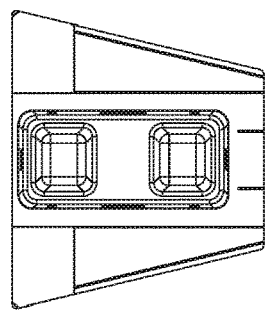
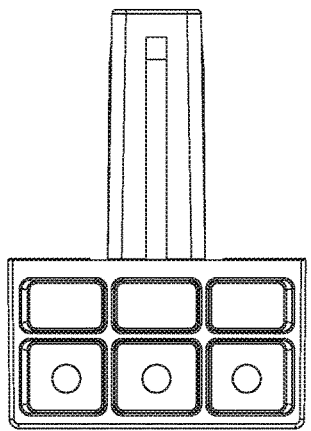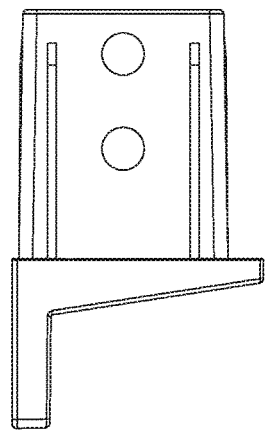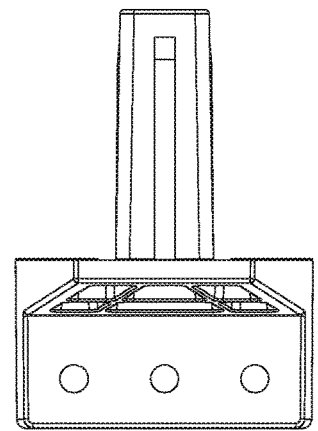
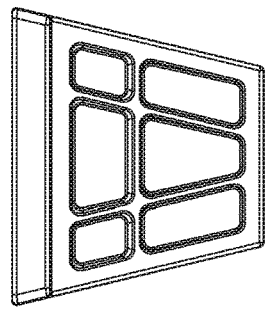
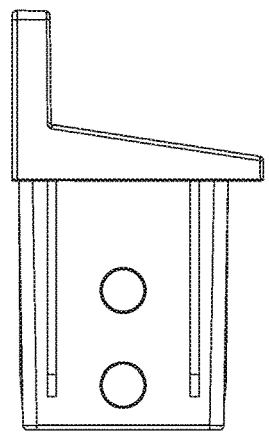
FIG. 7

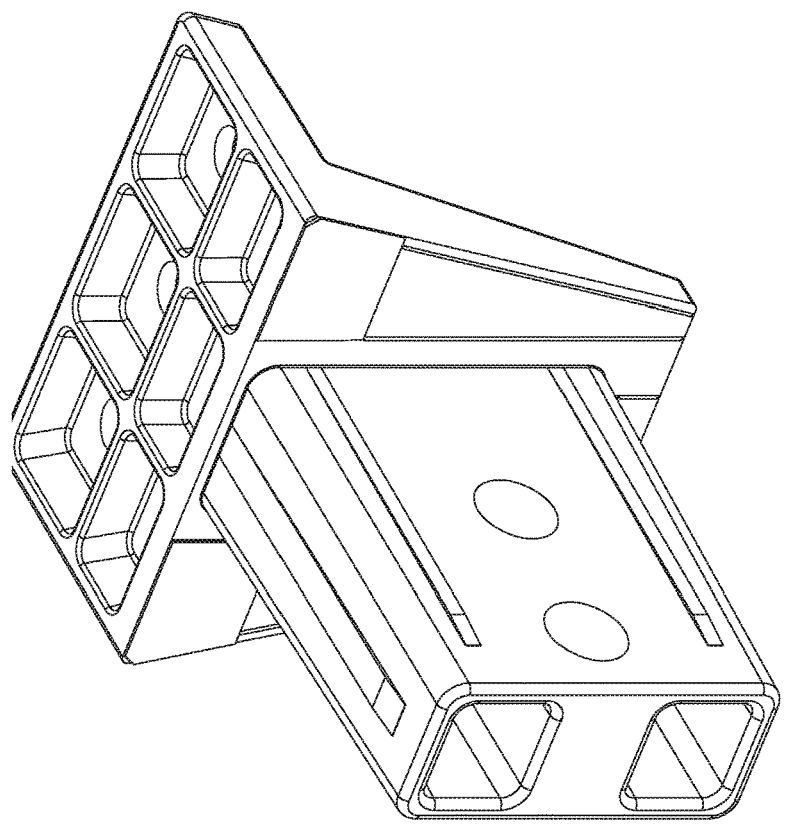
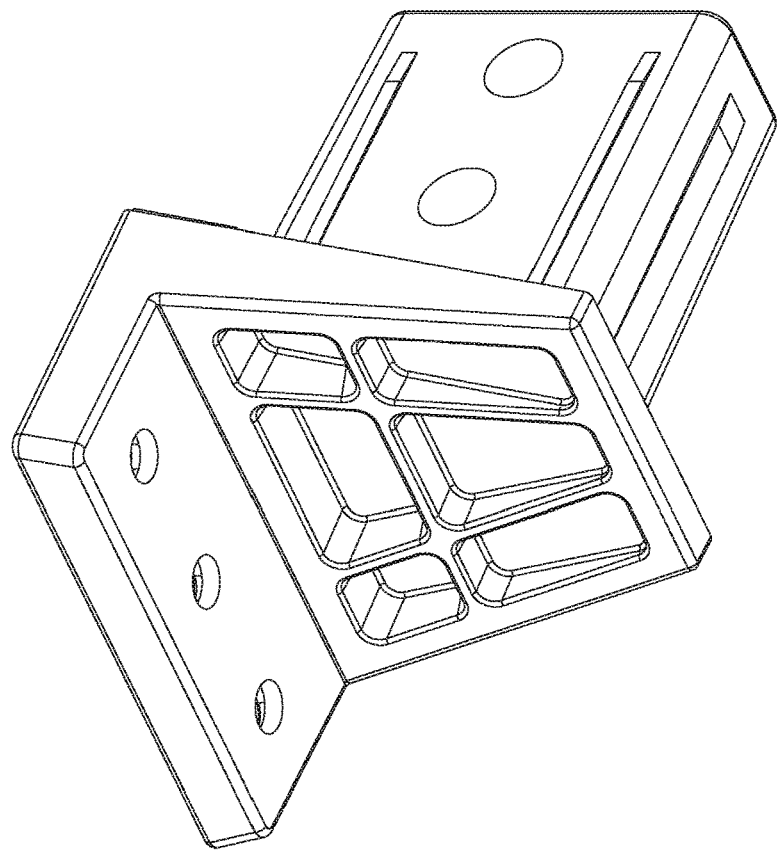
FIG. 14

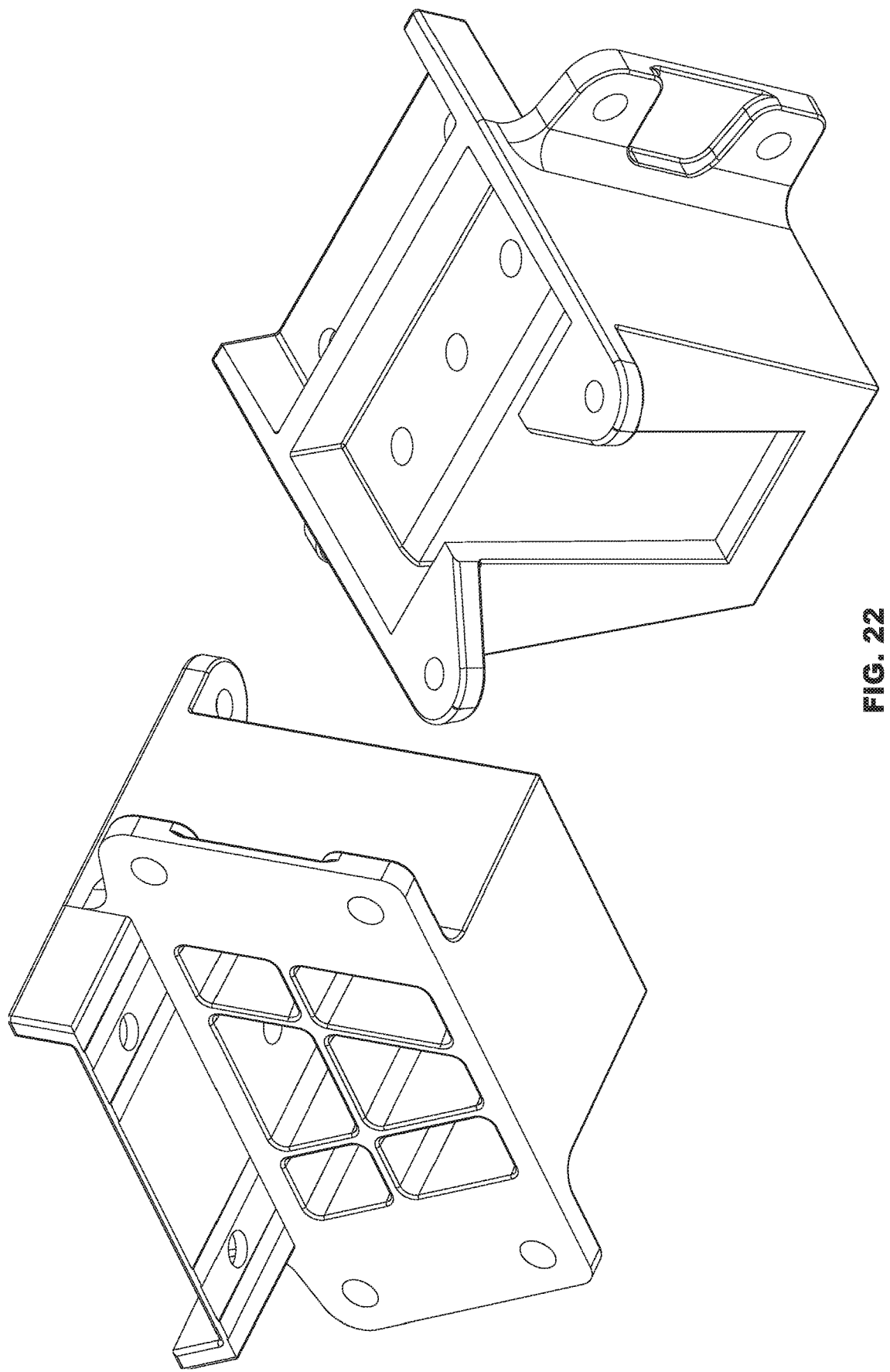

SUPPORT BEAM CONNECTOR SYSTEM

CROSS REFERENCE TO RELATED APPLICATION

This application claims priority to Provisional Application No. 62/517,613, filed Jun. 9, 2017, which is herein incorporated by reference in its entirety.

BACKGROUND

Support beams may be used in a variety of different modular structures (e.g., furniture, workspaces, desks). The support beams may be delivered, sold, or shipped, assembled or in disassembled multiple parts. Brackets may be used to connect multiple support beams together to form the structures.

SUMMARY

Various aspects of the present disclosure are directed toward apparatuses, methods, and systems for connecting a first support and a second support. The apparatuses, methods, and systems uses brackets to form a modular system. The apparatuses, methods, and systems may also connect additional supports using the brackets. The modular system may be used in a variety of different structures such as frames, framing products, desks, furniture, walls, wall products, tables, benching, workspaces, and other modular structures/objects. Brackets and supports form at least a portion of an assembly of the structures/objects.

In certain instances, the apparatuses, methods, and systems may include a first bracket arranged on the first support and including a male portion. In addition, the apparatuses, methods, and systems include a second bracket arranged on the second support and including a female portion configured to receive the male portion to connect the first support and the second support and form a substantially planar upper surface across the first bracket and the second bracket.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIGS. 7-14 show various views of example brackets having a male portion, in accordance with various aspects of the present disclosure.

FIGS. 15-22 show various views of example brackets having a female portion, in accordance with various aspects of the present disclosure.

Figure 1:
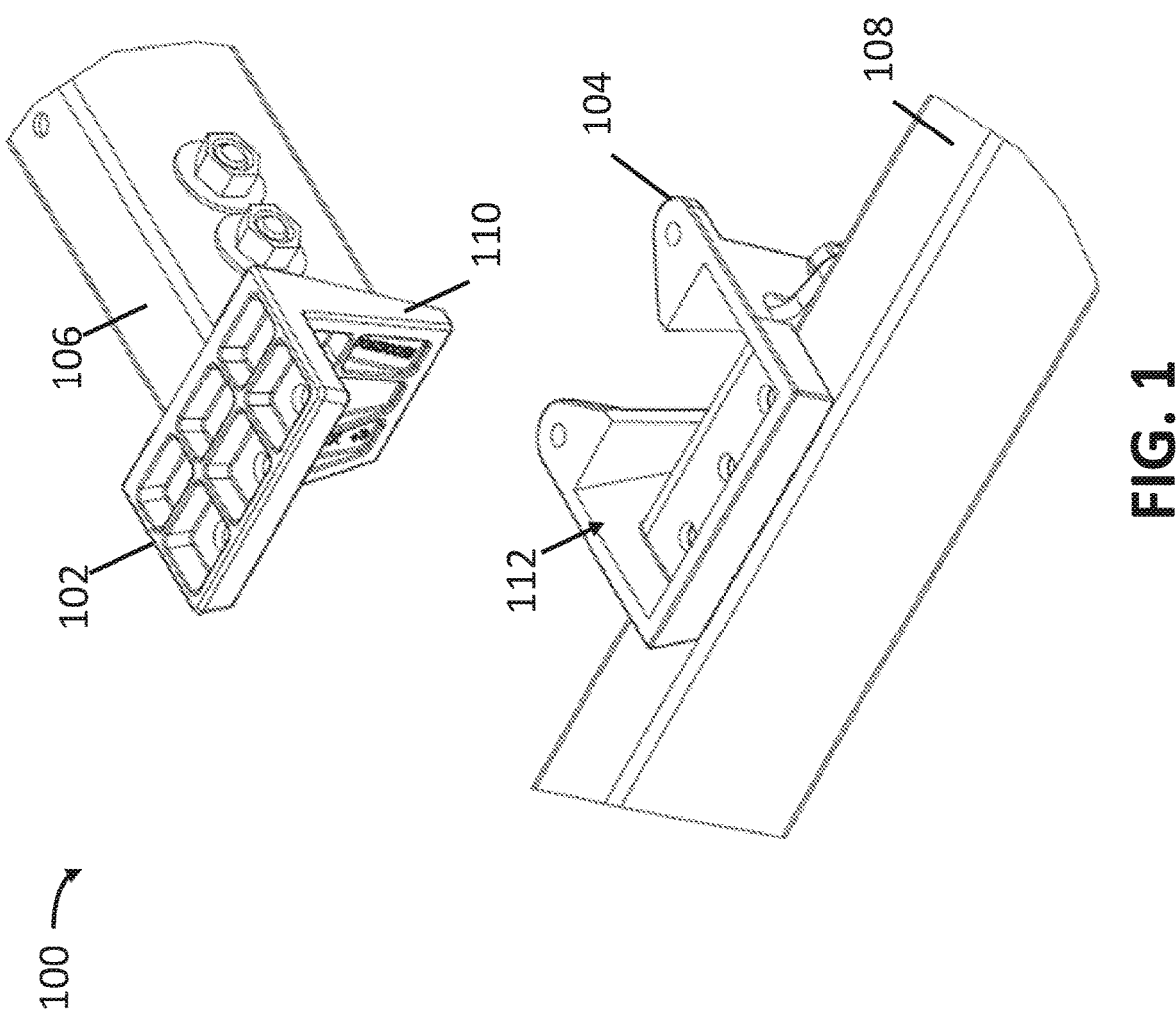
FIG. 1 shows an example modular system that includes a first bracket and a second bracket, in accordance with various aspects of the present disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various aspects of the present disclosure are directed toward modular system that may be used in a variety of different structures such as frames, framing products, desks, furniture, walls, wall products, tables, benching, workspaces, and other modular structures/objects. Brackets and supports form at least a portion of an assembly of the structures/objects. The brackets may be used to connect support beams. The supports and brackets may be delivered, sold, or shipped assembled or in disassembled multiple parts. The brackets and supports may be first customized to a specific or for a specific structure, and provided to an end user. In certain instances, for example, the brackets are coupled, attached, or secured to the supports prior to delivery to the end user for final assembly of the modular system. Coupling, attaching, or securing the brackets to the supports prior to delivery to the end user, in certain instances, facilitates ease of assembly of the modular system. As described in further detail below, the end user is not required to align brackets with the supports or hold brackets and supports in place the parts while securing the brackets to the supports.

FIG. 1 shows an example modular system 100 with a first bracket 102 and a second bracket 104, in accordance with various aspects of the present disclosure. The first bracket 102 is arranged on a first support 106 and the second bracket 104 is arranged on a second support 108. The modular system 100 may be used for connecting the first support 106 and the second support 108. In addition, the modular support may form a portion or the entirety of a variety of different structures such as frames, framing products, desks, furniture, walls, wall products, tables, benching, workspaces, and other modular structures/objects.

As shown in FIG. 1, the first bracket 102 includes a male portion 110 and the second bracket 104 includes a female portion 112. The female portion 112 of the second bracket 104 is configured to receive the male portion 110 of the first bracket 102 to connect the first support 106. The female portion 112 of the second bracket 104 and male portion 110 of the first bracket 102 are corresponding pieces. The female portion 112 of the second bracket 104 provides a guide for insertion of the male portion 110 of the first bracket 102. In certain instances, the female portion 112 of the second bracket 104 providing the guide for the insertion of the male portion 110 of the first bracket 102 assists in an end user's ease of assembly of the modular system 100.

In certain instances, the first bracket 102 is coupled, attached, or secured to the first support 106 and the second bracket 104 is coupled, attached, or secured to the second support 108. The first bracket 102 and the second bracket 104 may be respectively coupled, attached, or secured to the first support 106 and the second support 108 by screws or other fastening members. In certain instances, the support 106 and the second support 108 may be formed of wood, plastic, or other materials. The support 106 and the second support 108 may be formed of a metal material (e.g., sheet metal, tin, aluminum, steel). In addition, the first bracket 102 and second bracket 104 may also be formed of a metal material.

Figure 2:
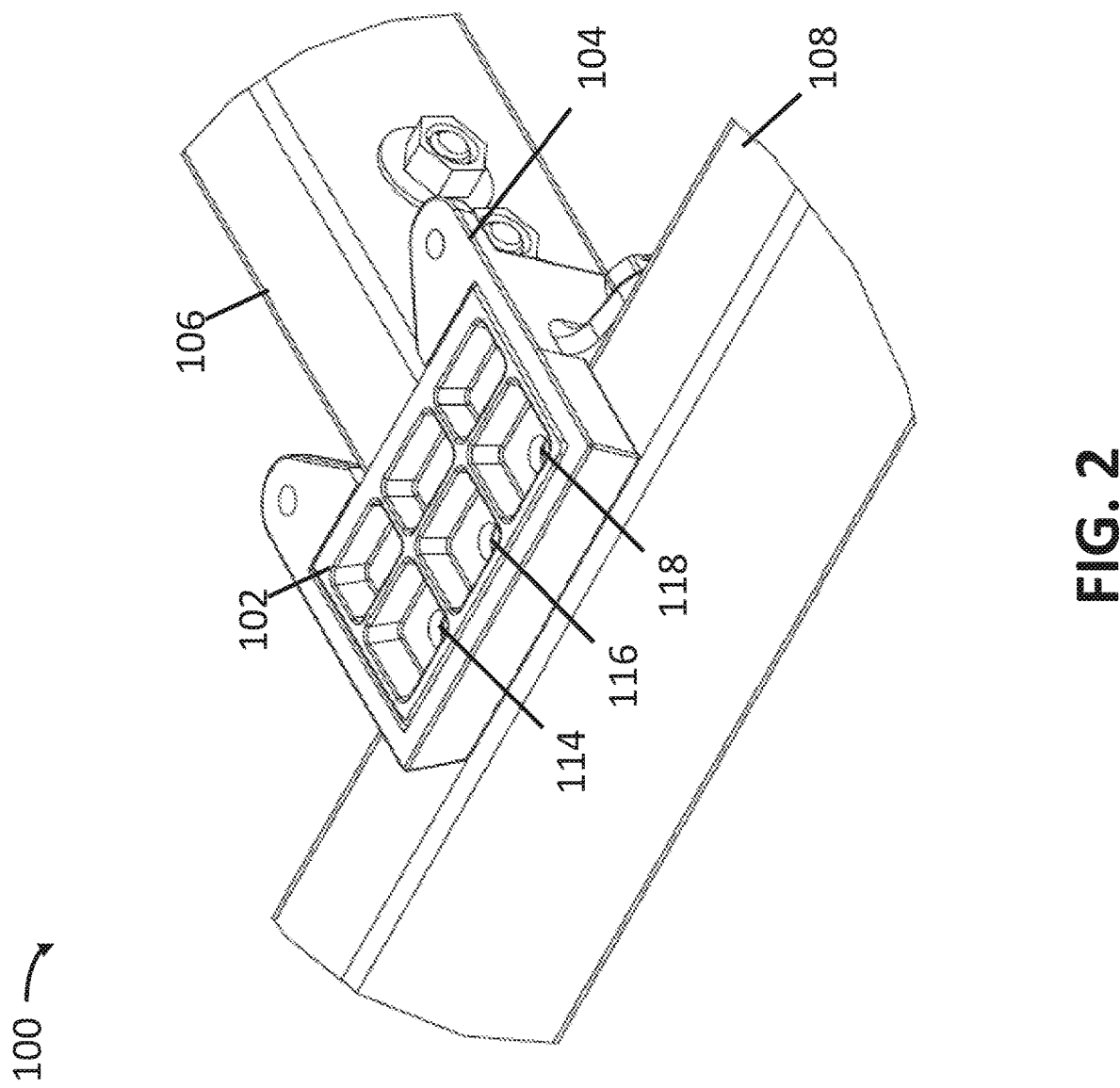
FIG. 2 shows an example modular system with a first bracket engaged with a second bracket, in accordance with various aspects of the present disclosure.

FIG. 2 shows an example modular system 100 that with a first bracket 102 engaged with a second bracket 104, in accordance with various aspects of the present disclosure. The modular system 100 connects/couples a first support 106 and a second support 108. In addition and by the first bracket 102 and the second bracket 104 connecting the first support 106 and the second support 108, a substantially planar upper surface may be formed across the first bracket 102 and the second bracket 104 as shown in FIG. 2.

The first bracket 102 may include one or more portions that nest within a corresponding portion of the second bracket 104. As noted above with reference to FIG. 1, for example, a male portion (not shown) of the first bracket 102 may nest within a female portion (not shown) of the second bracket 104. Other portions of the second bracket 104 may have corresponding (and opposite portions) on the first bracket 102 to facilitate coupling between the first bracket 102 and the second bracket 104 and to enhance the structural stability of the modular system 100. The first bracket 102 and the second bracket 104 interfacing in this manner provides structural stability to the modular system 100. In certain instances, the portions of the first bracket 102 and the second bracket 104 are configured to nest and connect to tightly fit together such that movement between the first bracket 102 and the second bracket 104 is non-existent or minimal. As a result, forces that may be applied to the modular system 100 are absorbed by the portions of the system such that the modular system 100 does not move or shake.

In addition, the first bracket 102 and the second bracket 104 may enhance the ease of assembly of the modular system 100. Further, an end user assembling the modular system 100, for example, has visual indications as to whether the first bracket 102 is properly seated, nested, or aligned within the second bracket 104. The portions of the first bracket 102 and the second bracket 104 provide structural guides for assembling the modular system 100.

In certain instances, the first bracket 102 includes one or more guides 114, 116, 118 configured to visually indicate securement locations for attachment mechanisms configured to mechanically secure the first bracket 102 to the second support 108. One or more attachment mechanisms (such as screws) may be provided through the guides 114, 116, 118 to secure the first bracket 102, through the second bracket 104, to the second support 108. The guides 114, 116, 118 contribute to the ease of assembly of the modular system 100 by indicating to the end user where the one or more attachment mechanisms are to be utilized.

Figure 3:
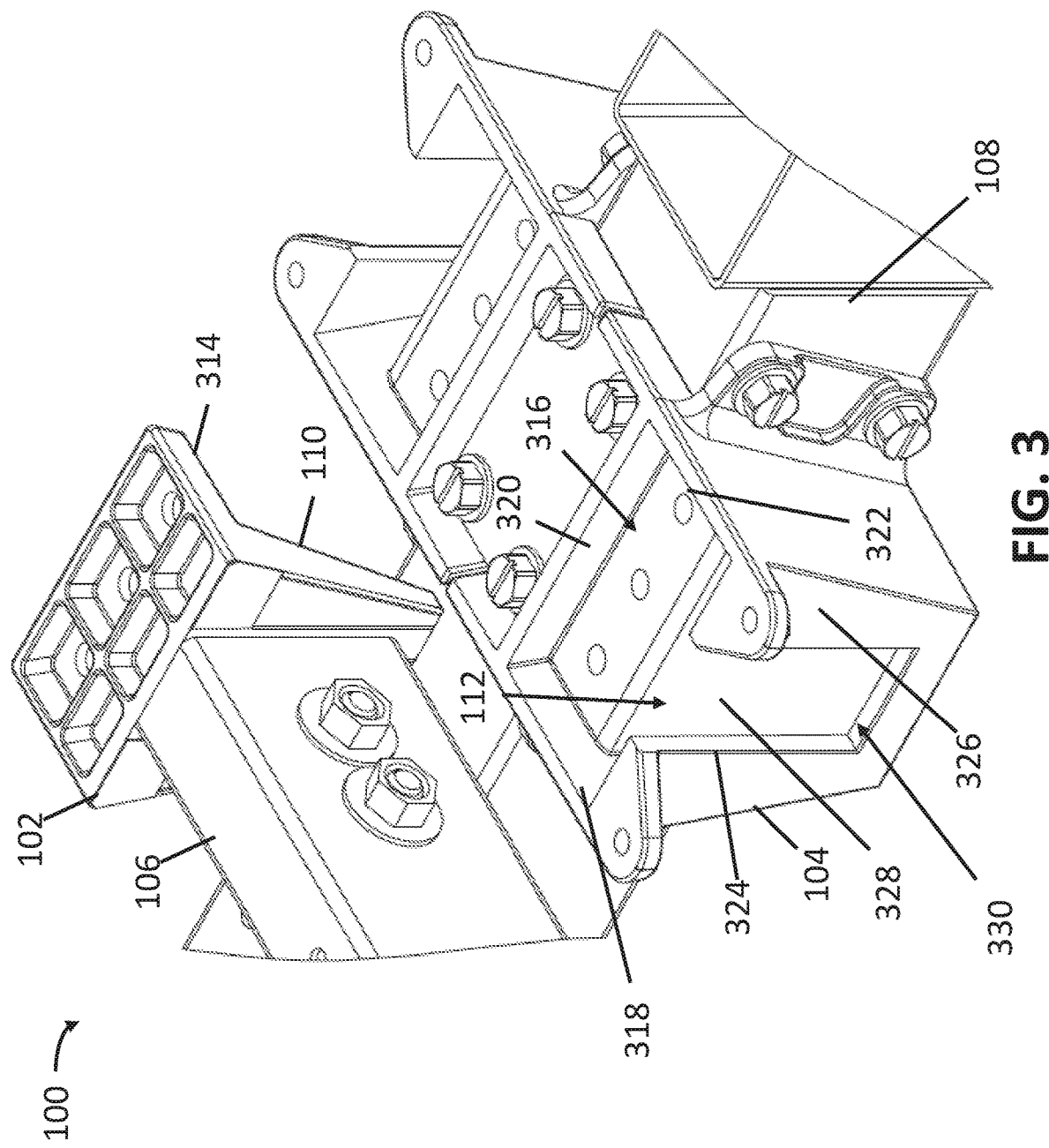
FIG. 3 shows an example modular system, in accordance with various aspects of the present disclosure.

FIG. 3 shows an example modular system 100, in accordance with various aspects of the present disclosure. The modular system 100 shown in FIG. 3 includes a first bracket 102 arranged on a first support 106 and a second bracket 104 arranged on a second support 108. The modular system 100 may be used for connecting the first support 106 and the second support 108. In addition, the modular support may form a portion or the entirety of a variety of different structures such as frames, framing products, desks, furniture, walls, wall products, tables, benching, workspaces, and other modular structures/objects.

As shown in FIG. 3, the first bracket 102 includes a male portion 110 and a substantially planar portion 314. The male portion 110, in certain instances, extends from the substantially planar portion 314. In certain instances, the male portion 110 extends at an angle from the substantially planar portion 314 as shown in FIG. 3. The male portion 110 may form an obtuse angle with the substantially planar portion 314.

Further, the second bracket 104 includes a female portion 112 and a nesting portion 316 as shown in FIG. 3. The female portion 112 may extend from the nesting portion 316 of the second bracket 104. In certain instances, the female portion 112 extends from the nesting portion 316 in approximately a vertical plane. In certain instances, the female portion 112 extends at an angle from the substantially planar portion 314 as shown in FIG. 3.

The female portion 112 of the second bracket 104 is configured to receive the male portion 110 of the first bracket 102. Similarly, the nesting portion 316 of the second bracket 102 is configured to receive the substantially planar portion 314 of the first bracket 102. The female portion 112 of the second bracket 104 is configured to guide insertion of the male portion 110 of the first bracket 102 to link the first bracket 102 and the second bracket 104. The female portion 112 and the nesting portion 316 of the second bracket 104 respectively form a tight or close-fitting (such that minimal gaps exist therebetween) assembly with the male portion 110 and the substantially planar portion 314 of the first bracket 102.

Figure 4:
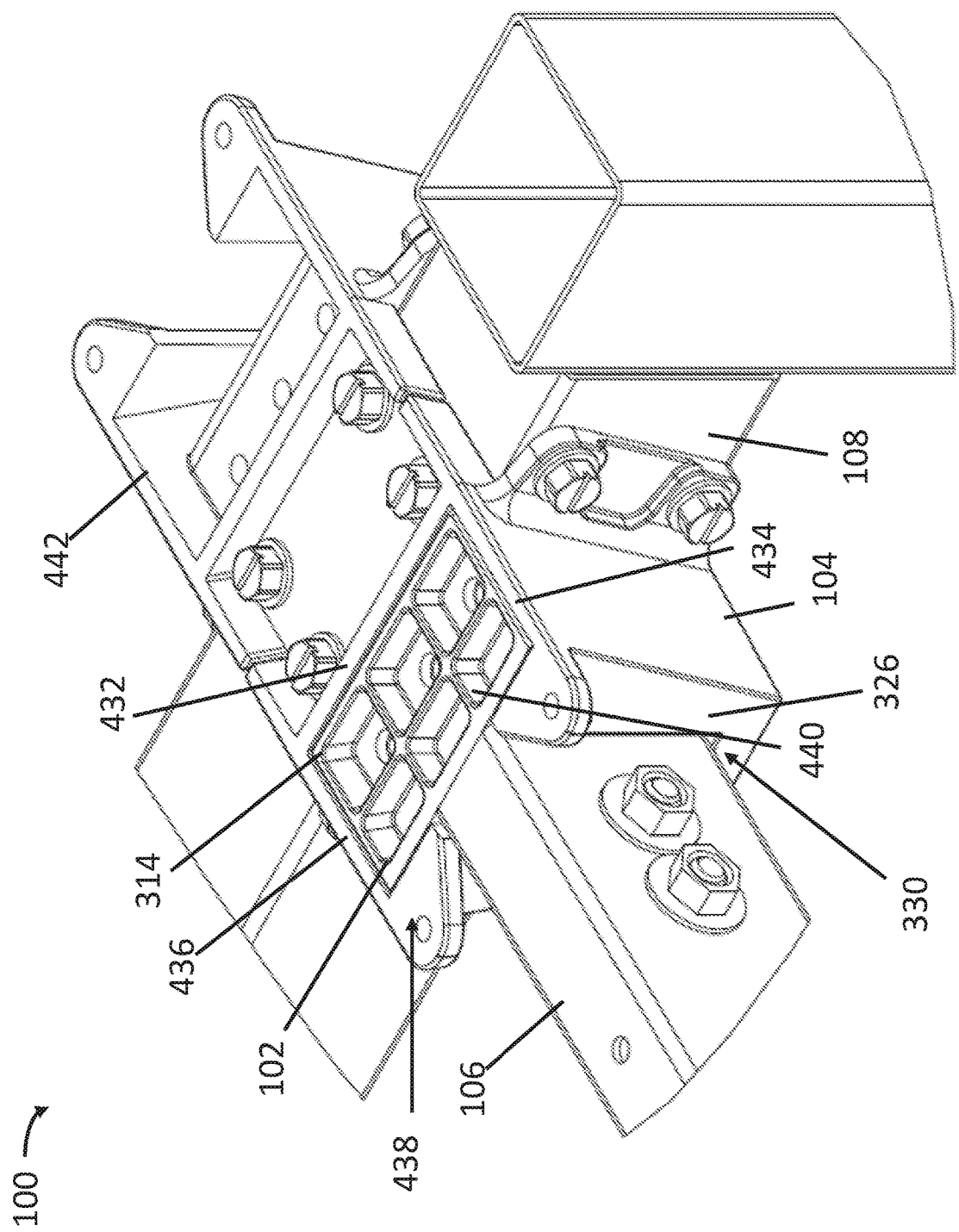
FIG. 4 shows an example modular system with brackets engaged, in accordance with various aspects of the present disclosure.

In certain instances, the nesting portion 316 of the second bracket 104 includes sidewalls 318, 320, 322 configured to at least partially surround the substantially planar portion 314 of the first bracket 102 when the first bracket 102 and the second bracket 104 are engaged (e.g., as shown in FIG. 4). In addition, the female portion 112 of the second bracket 104 includes sidewalls 324, 326, 328 configured to at least partially surround the male portion 110 of the first bracket 102 when the first bracket 102 and the second bracket 104 are engaged (e.g., as shown in FIG. 4). In addition, the sidewalls 324, 326, 328 of the female portion 112 of the second bracket 104 form an opening 330 for extension of the first support 106 therethrough when the second bracket 104 and the first bracket 102 are engaged (e.g., as shown in FIG. 4).

FIG. 4 shows an example modular system 100 with brackets engaged, in accordance with various aspects of the present disclosure. As shown in FIG. 4, upper portions 432, 434, 436 of the sidewalls 318, 320, 322 of the nesting portion 316 and the substantially planar portion 314 of the first bracket 102 are configured to form the substantially planar upper surface 438 across the of the first bracket 102 and the second bracket 104. In certain instances, the substantially planar upper surface 438 formed across the first bracket 102 and the second bracket 104 is substantially planar with at least one of the first support 106 and the second support 108. As shown in FIG. 4, the substantially planar upper surface 438 is substantially planar with the first support 106. In addition, the nesting portion 316 of the second bracket 104 is configured to at least partially surround the substantially planar portion 314 of the first bracket 102.

In certain instances, the substantially planar portion 314 of the first bracket 104 includes ribs 440 configured to structurally stabilize the first bracket 102. The ribs 440 may lessen the material needed for the first bracket 104 without compromising the structural stability of the first bracket 104 and also provide sufficient flexibility to the modular system 100. In certain instances, the first bracket 102 and second bracket 104 may be formed of zinc (or other metal materials).

The first bracket 102 and the second bracket 104 may enhance the ease of assembly of the modular system 100. An end user assembling the modular system 100, for example, has visual indications as to whether the first bracket 102 is properly seated, nested, or aligned within the second bracket 104. The portions of the first bracket 102 and the second bracket 104 provide structural guides for assembling the modular system 100. As noted above with reference to FIG. 3, the male portion 110 may form an obtuse angle with the substantially planar portion 314. Similarly, the corresponding female portion 112 of the second bracket 104 may form a corresponding obtuse angle with the nested portion 316. Angling of the male portion 110 and the female portion 112 assists the user in aligning the first bracket 102 and the second bracket 104. Angling of the male portion 110 and the female portion 112 gives leverage to the connection between the first bracket 102 and the second bracket 104 and increases frictional force between the first bracket 102 and the second bracket 104.

The first bracket 102 and the second bracket 104 interfacing in this manner provides structural stability to the modular system 100. In certain instances, the portions of the first bracket 102 and the second bracket 104 are configured to nest and connect to tightly fit together such that movement between the first bracket 102 and the second bracket 104 is non-existent or minimal. As a result, forces that may be applied to the modular system 100 are absorbed by the portions of the system such that the modular system 100 does not move or shake.

In certain instances, a modular system 100, consistent with various aspects of the present disclosure, may include additional brackets for coupling for additional supports added to the modular system 100. For example and as shown in FIG. 4, the modular system 100 includes an additional bracket 442 arranged on the second support 108. The additional bracket 442 may be configured similar or identical to the second bracket 104. Thus, the additional bracket 442 includes a female portion configured to receive a male portion of another bracket configured similar or identical to the first bracket 102.

In certain instances, the additional bracket 442 may be aligned on the second support 108 with the second bracket 104. In other instances, the second bracket 104 and the additional bracket 442 may be formed from a single piece and may be integral with one another.

Figure 5:
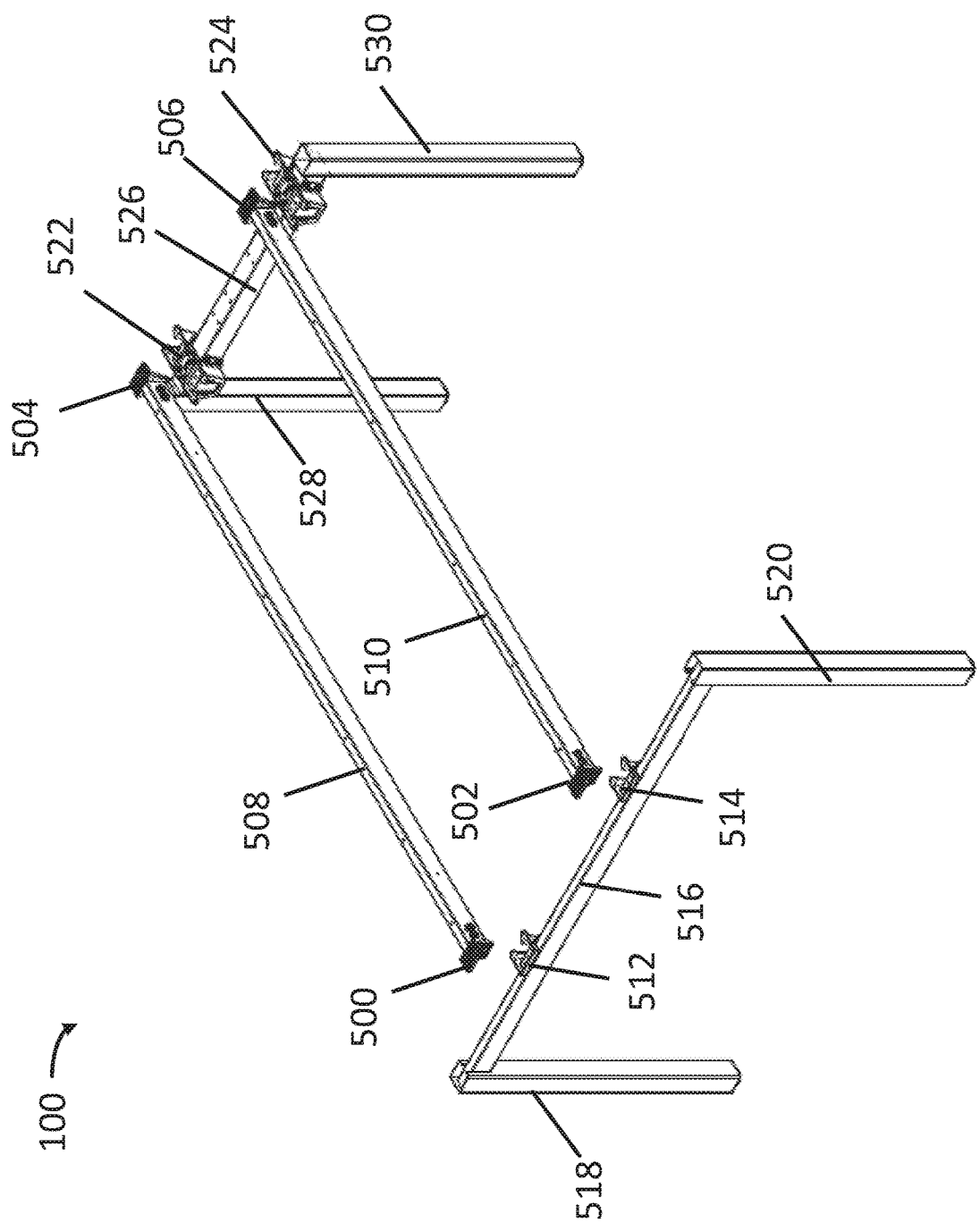
FIG. 5 shows another example modular system, in accordance with various aspects of the present disclosure.

FIG. 5 shows another example modular system 100, in accordance with various aspects of the present disclosure. The modular system includes multiple brackets 500, 502, 504, 506 that include male portions (e.g., as described in detail above). The brackets 500, 502, 504, 506 that include male portions are arranged on supports 508, 510. The supports 508, 510 may be cross-beams in the modular system 100. As shown in FIG. 5, the modular system 100 is a work-space. Although not shown, a table-top or desktop may be arranged on the supports 508, 510 to form a work area with multiple work stations. Brackets 500, 502, 504, 506 are attached at end portions of the supports 508, 510. The supports 508, 510 may have lengths that are customized based on the specific modular system 100.

In addition, the modular system 100 includes brackets 512, 514 that include a single female portion for connection with a male portion of brackets 500, 502. In certain instances, the brackets 512, 514 that include a single female portion are used on end portions of a frame, as shown in FIG. 5, where a starting or end point for supports 508, 510. The brackets 512, 514 are arranged on a support 516. The support 516 may be connected to legs 518, 520 at its ends.

Further, the modular system may include brackets 522, 524 that include two female portions for connection with a male portion of brackets 504, 506, and additional brackets (not shown) having a male portion. The additional brackets (not shown) having a male portion male be coupled or attached to a support (not shown) for extending or lengthening the modular system 100. The brackets 522, 524 that include two female portions are arranged on a support 526 that may be connected to legs 528, 530 at its ends. The brackets 522, 524 that include two female portions may be one piece or the brackets 522, 524 that include two female portions may be two separate structures attached to the support 526.

The combination of the supports 508, 510 and supports 516, 526 may be considered a frame section of the modular system 100. In certain instances, the modular system 100 may include additional sections not shown in FIG. 5 by attaching additional supports (similar or the same as supports 508, 510) to brackets 522, 524 having two female portions on opposite sides of the brackets 522, 524 having two female portions as the brackets 504, 506 having a male portion. The additional supports use brackets having male portions are similar or the same as brackets 504, 506 to engage with brackets 522, 524 having female portions.

In certain instances, supports and brackets shown in FIG. 5 may be delivered, sold, or shipped assembled or in disassembled in multiple parts. The brackets and supports may be first customized to a specific or for a specific structure, and provided to an end user. Brackets may be coupled, attached, or secured to the supports prior to delivery to the end user for final assembly of the modular system 100. Coupling, attaching, or securing the brackets to the supports prior to delivery to the end user, in certain instances, facilitates ease of assembly of the modular system 100. The end user is not required to align brackets with the supports or hold brackets and supports the parts in place while securing the brackets to the supports.

Figure 6:
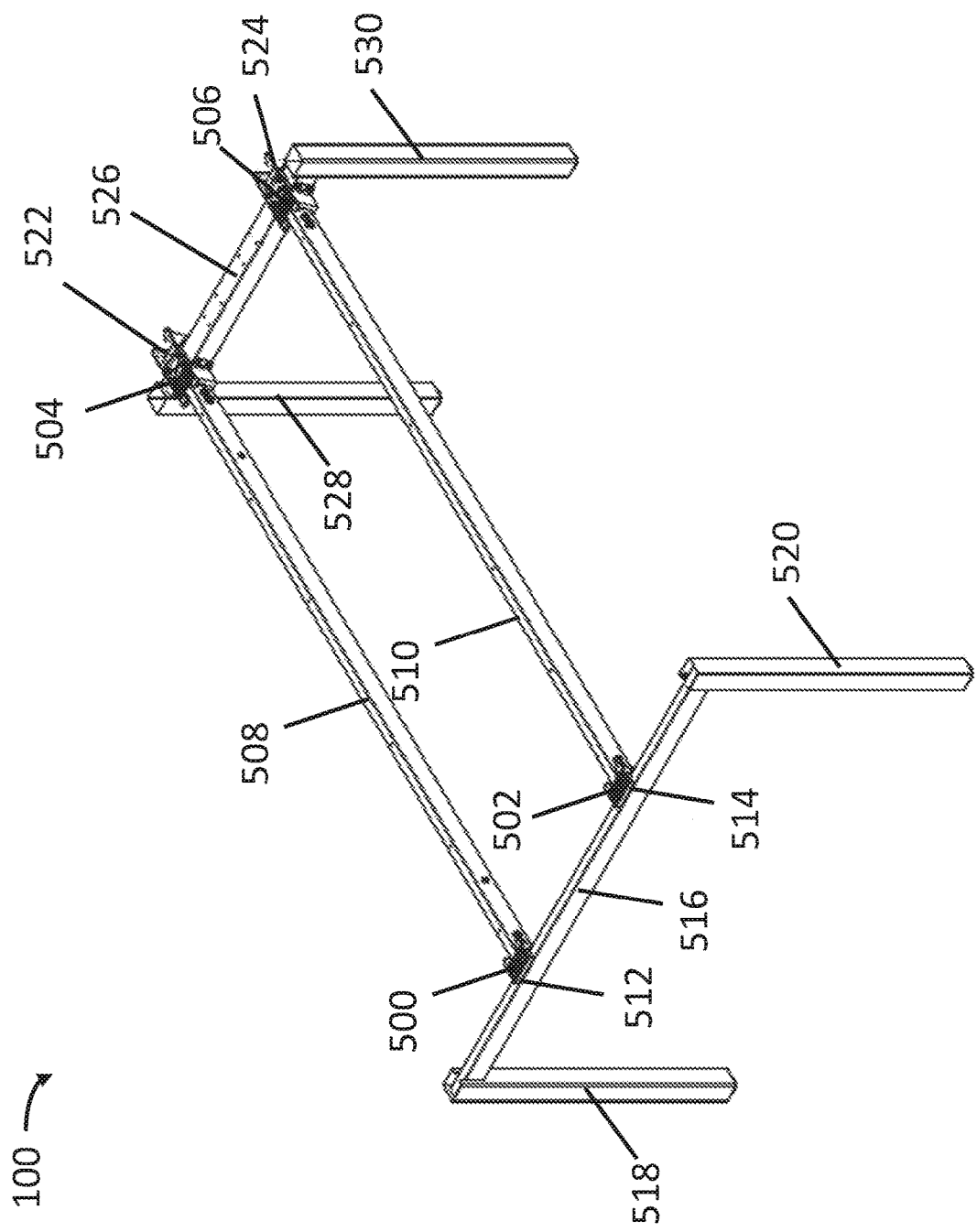
FIG. 6 shows another example modular system with brackets engaged, in accordance with various aspects of the present disclosure.
Figure 8:
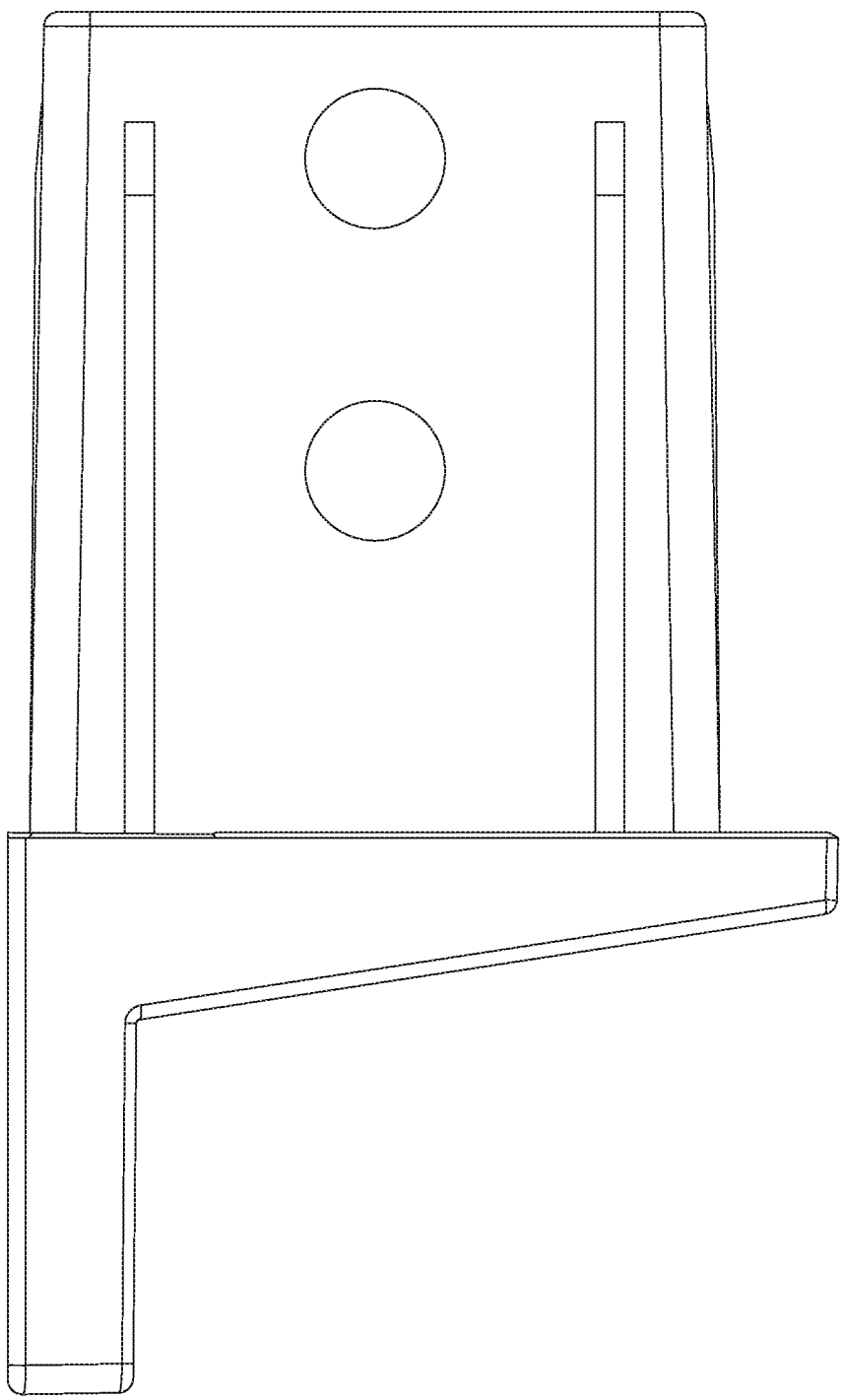
Figure 9:
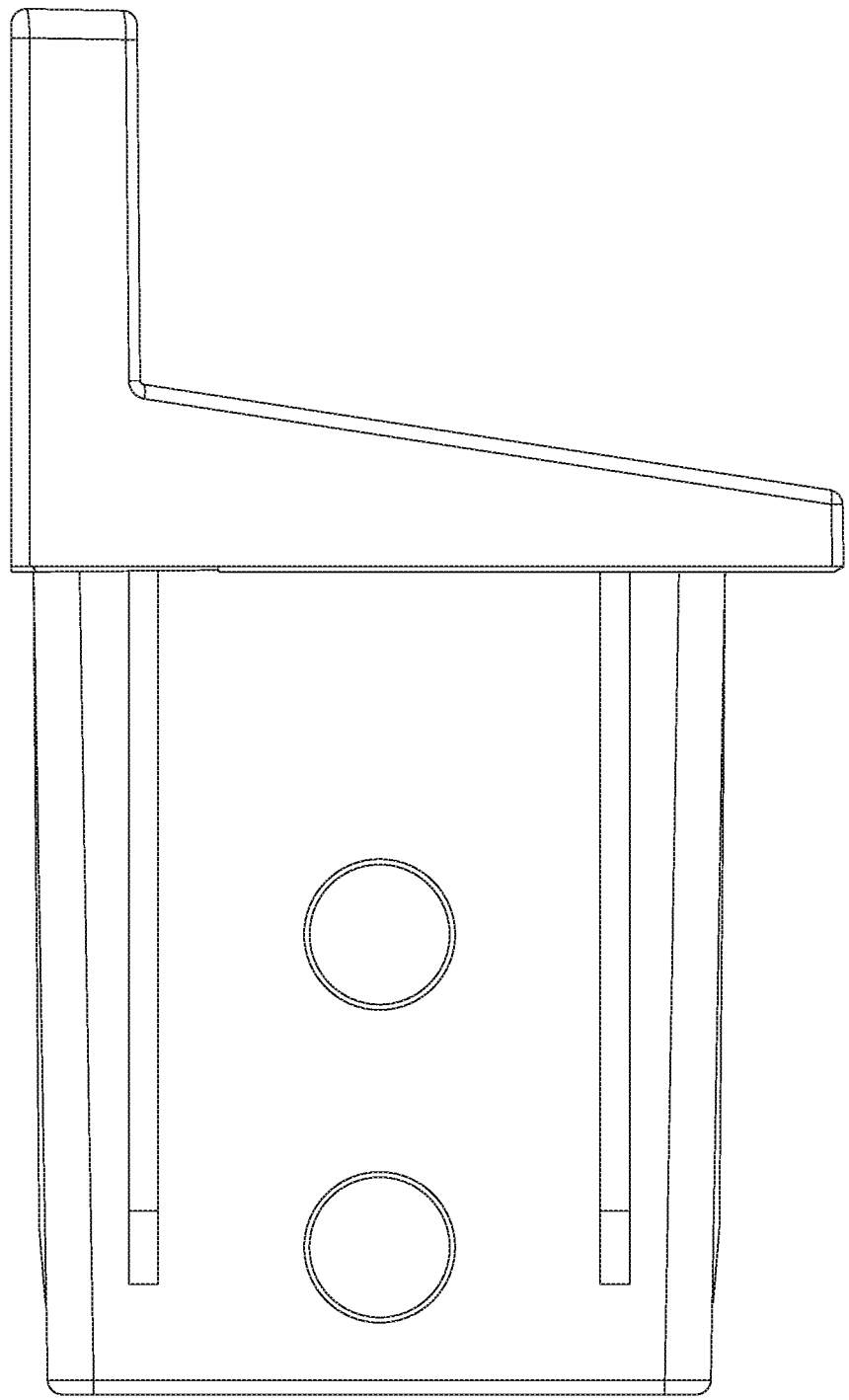
Figure 10:
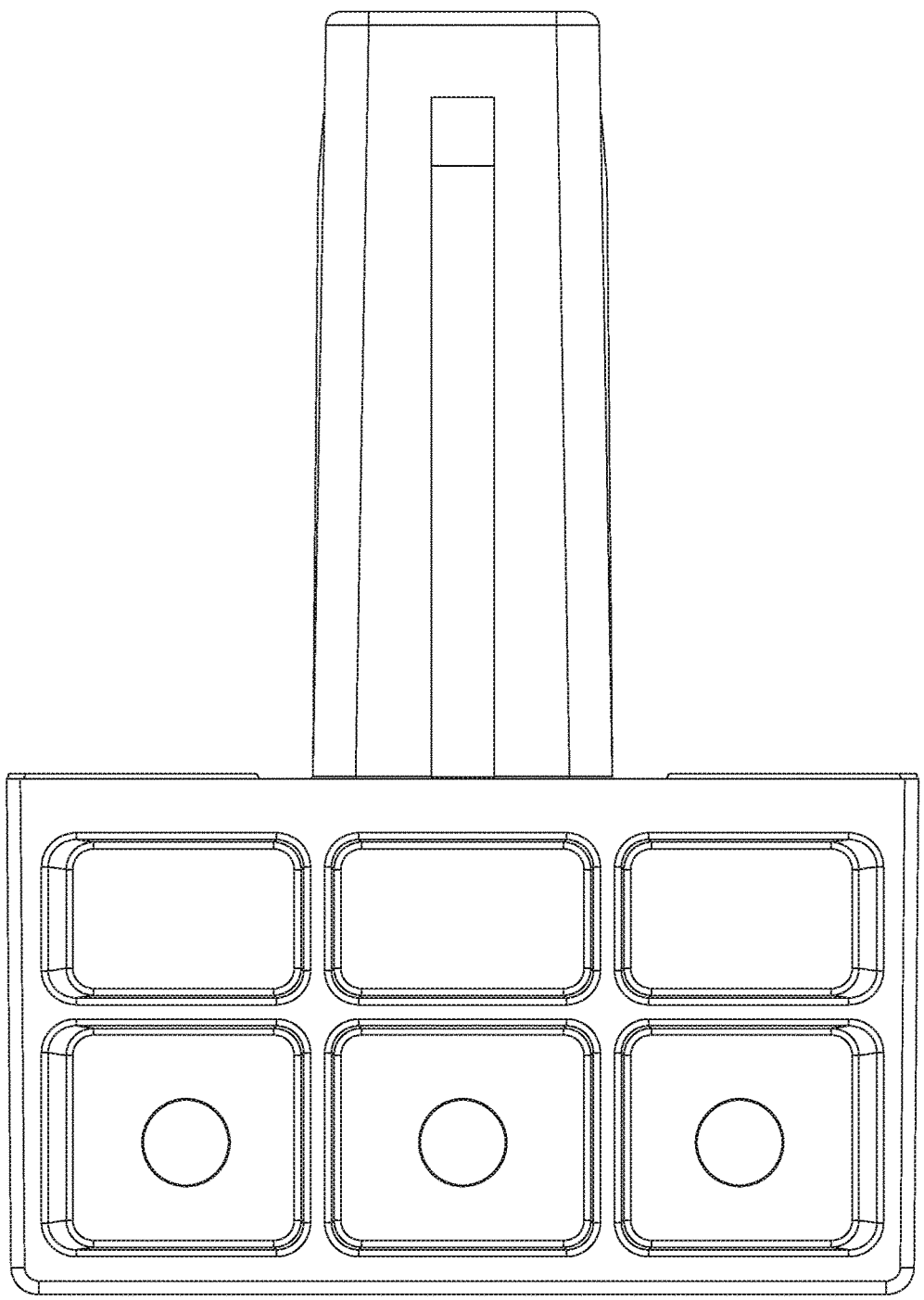
Figure 11:
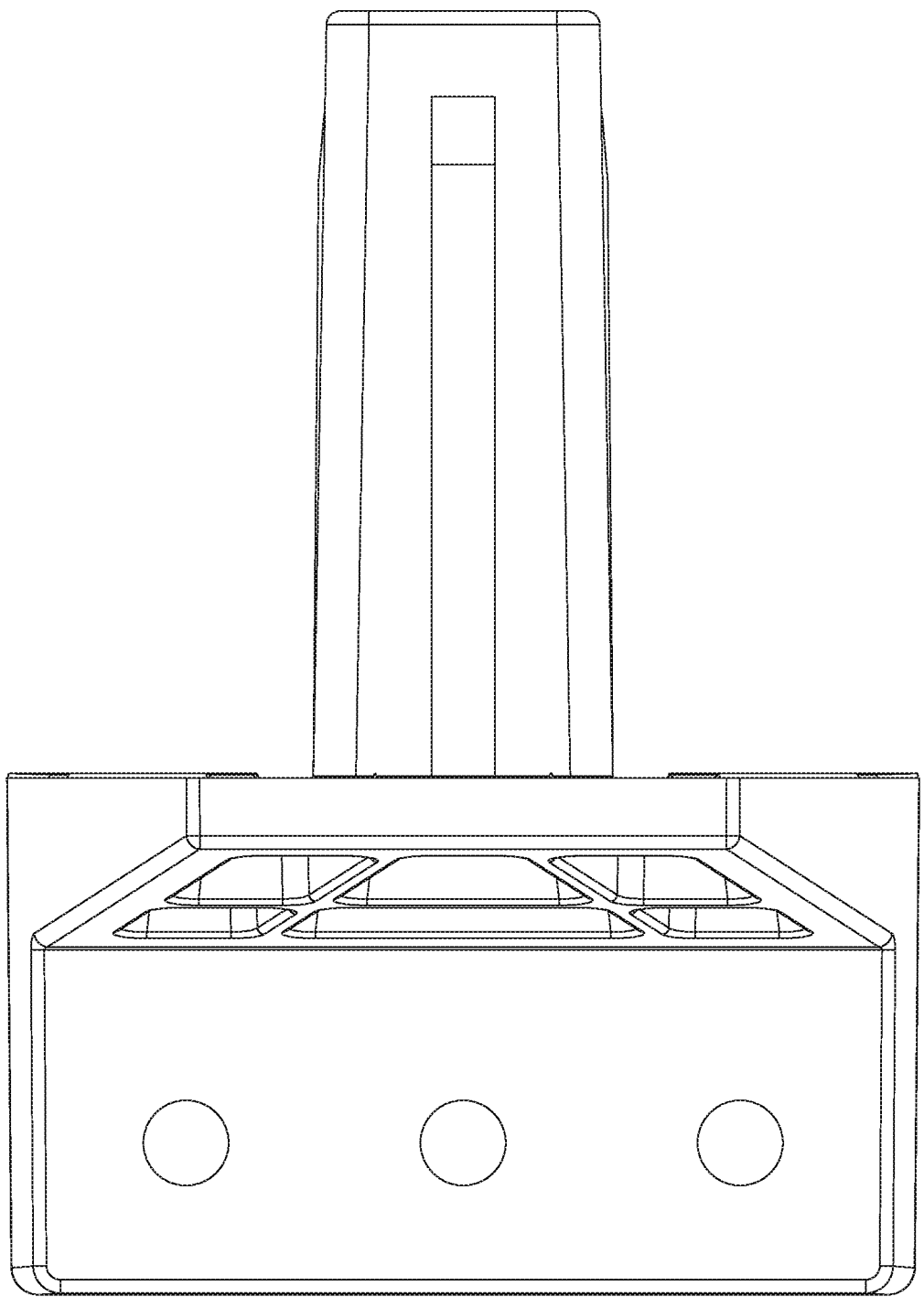
Figure 12:
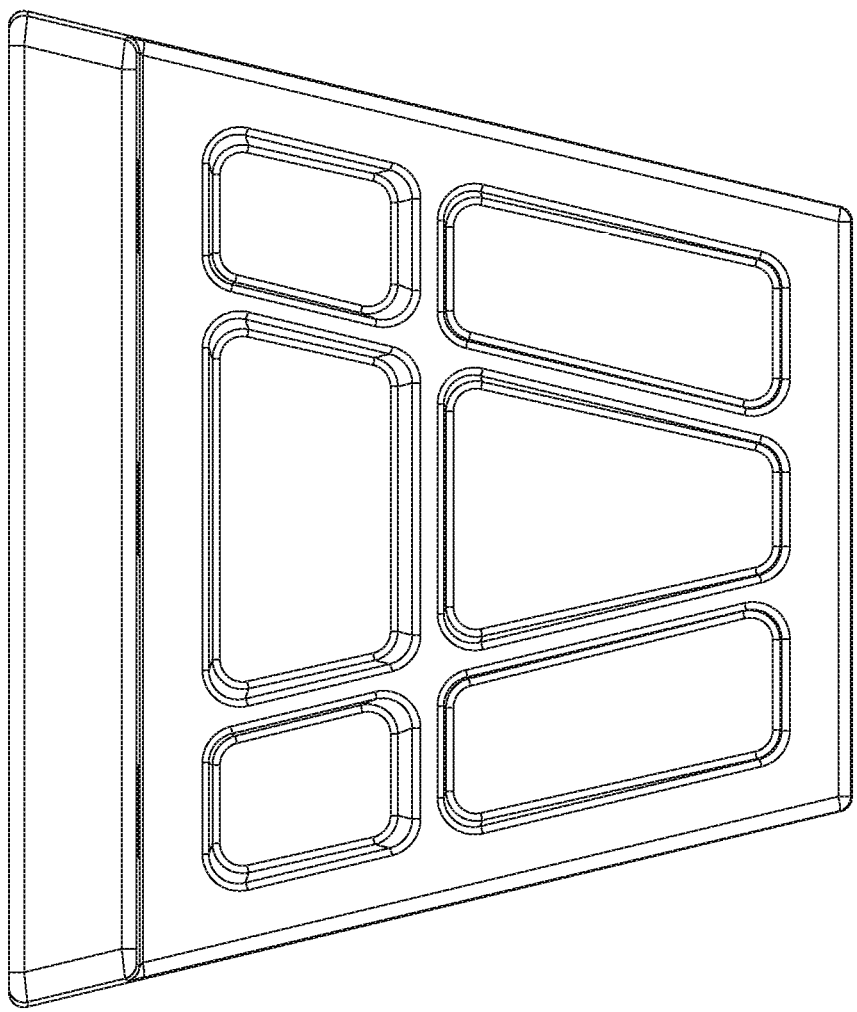
Figure 13:
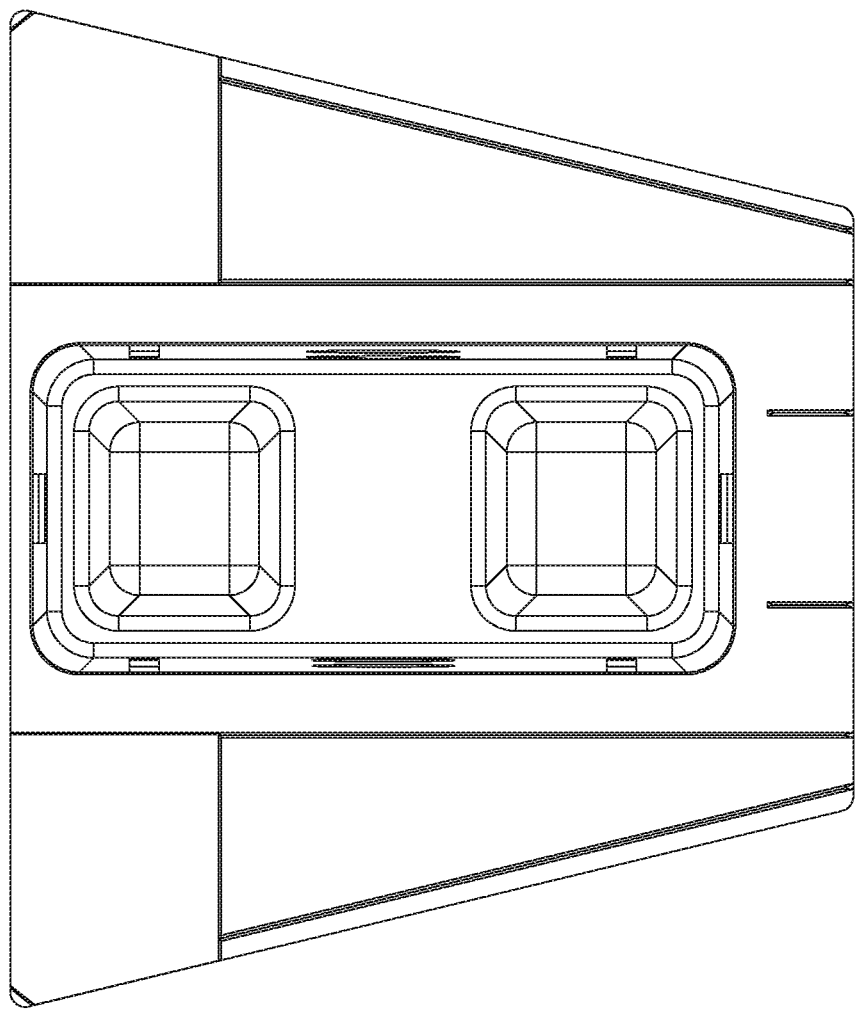
Figure 15:
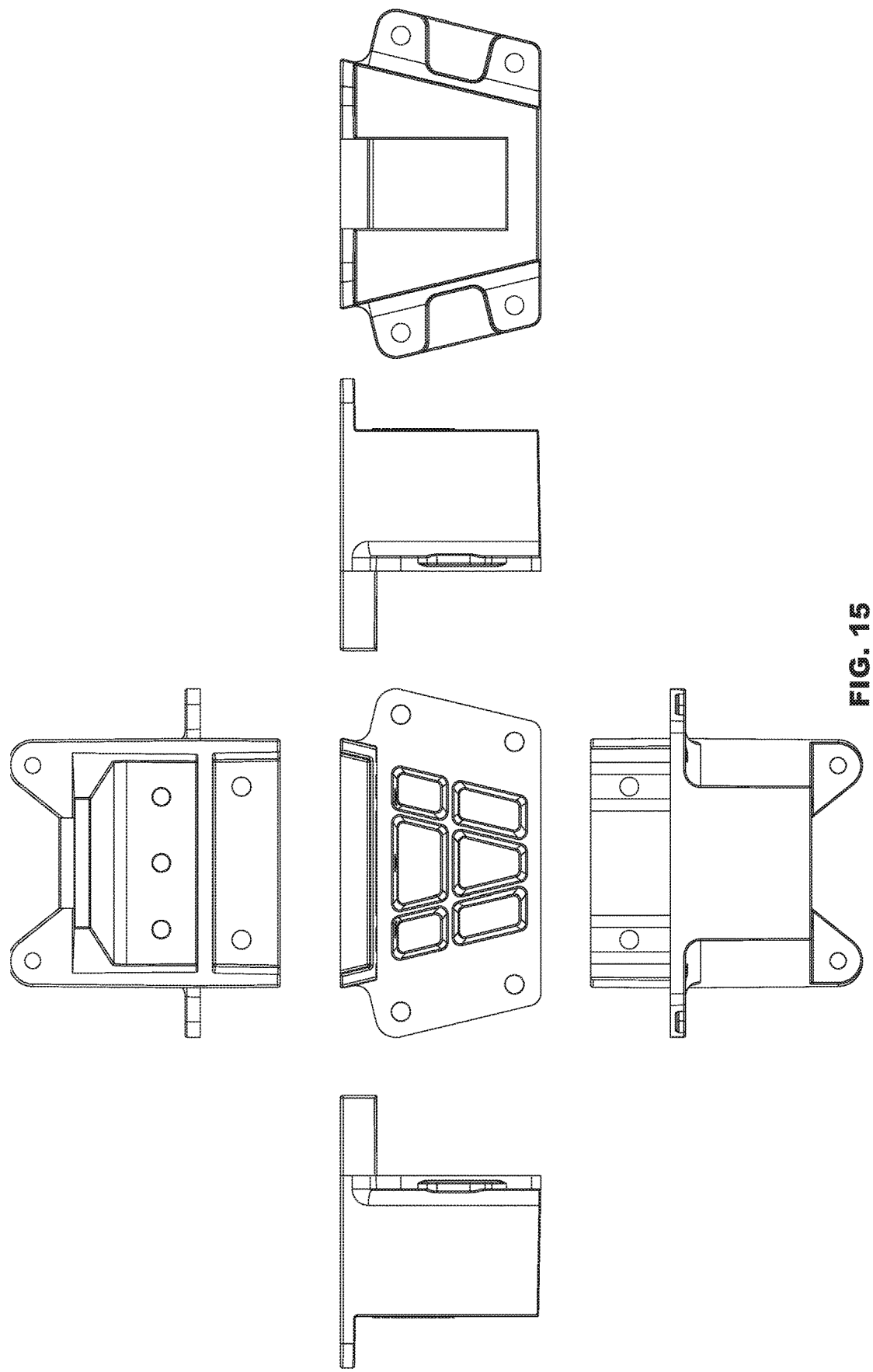
Figure 16:
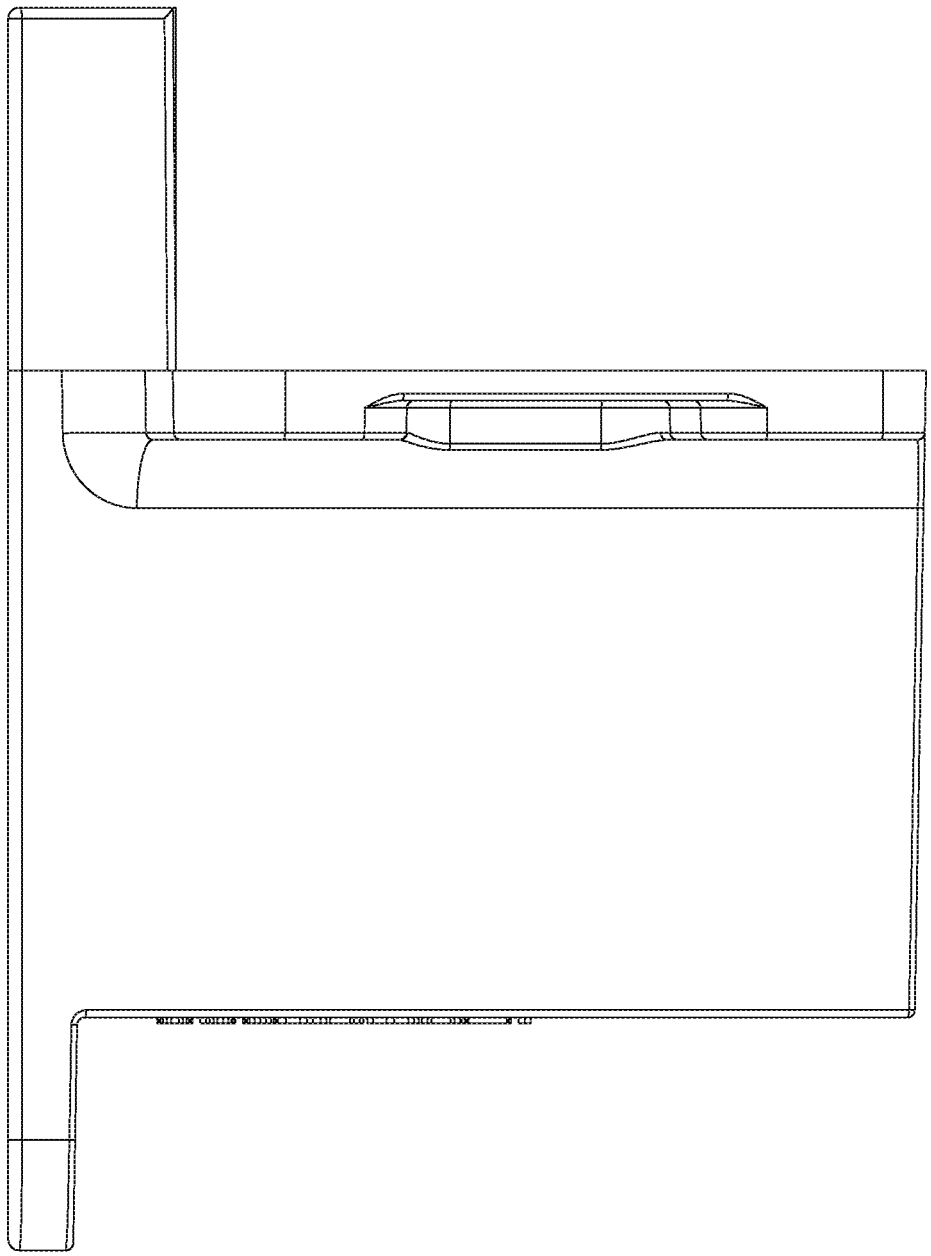
Figure 17:
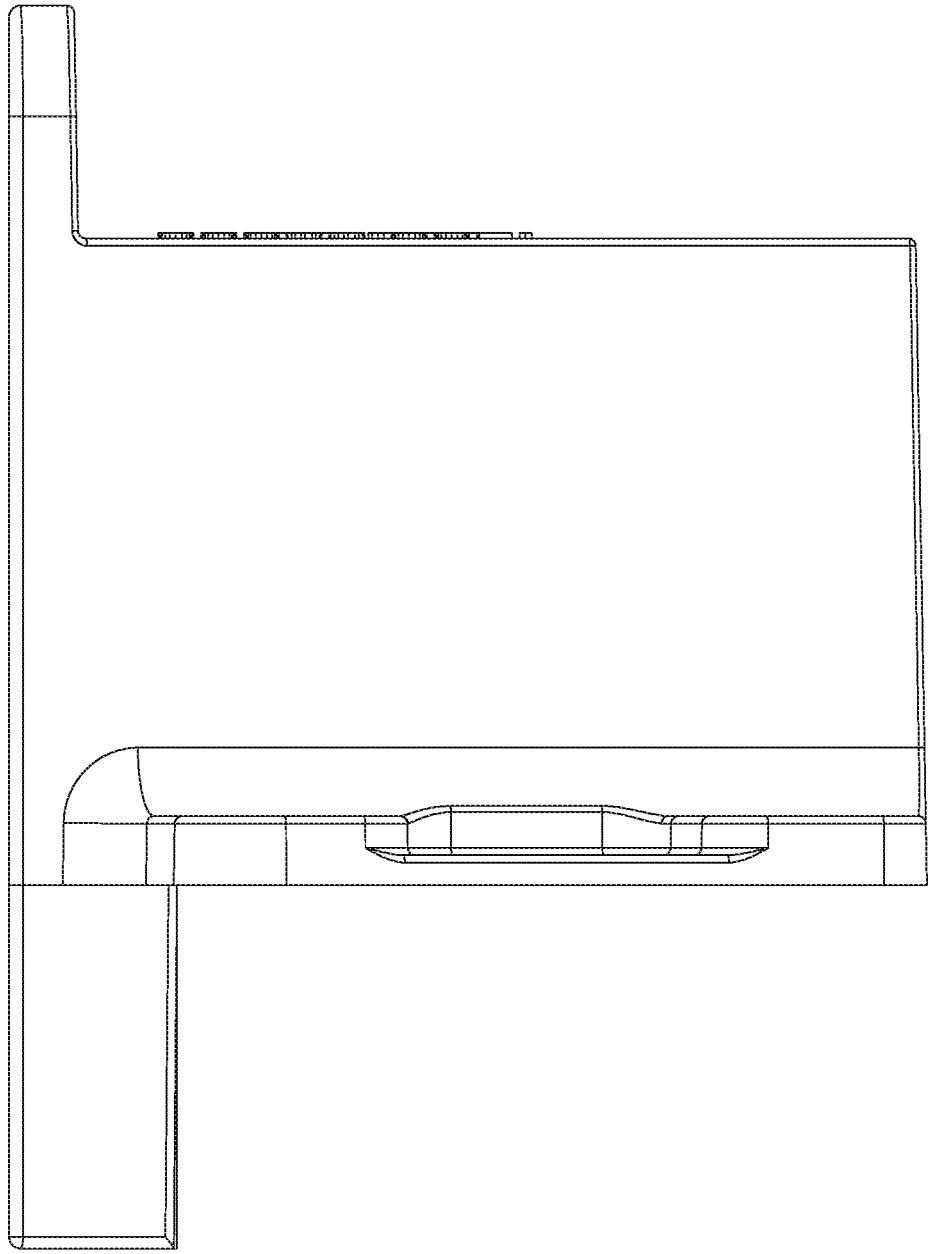
Figure 18:
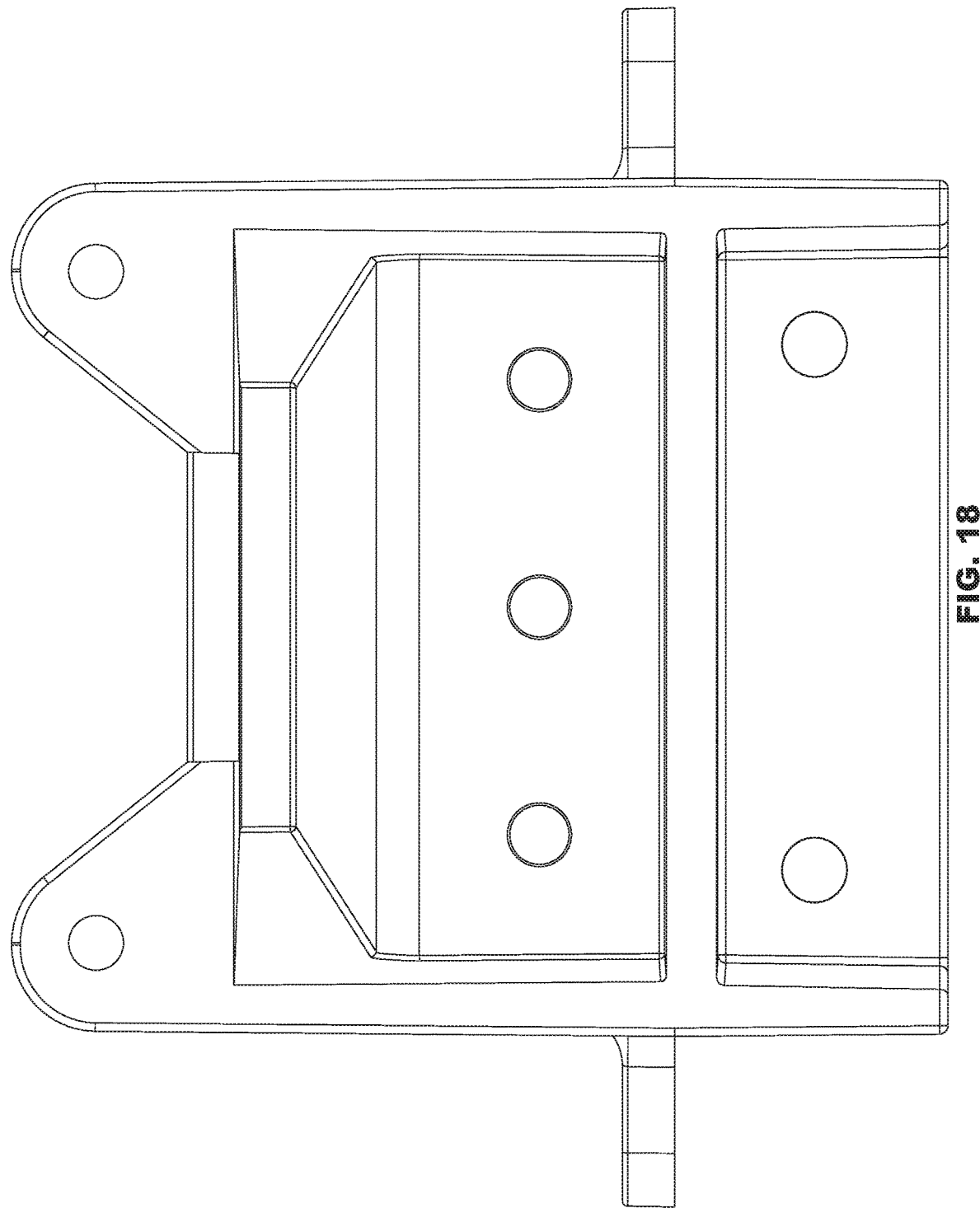
Figure 19:
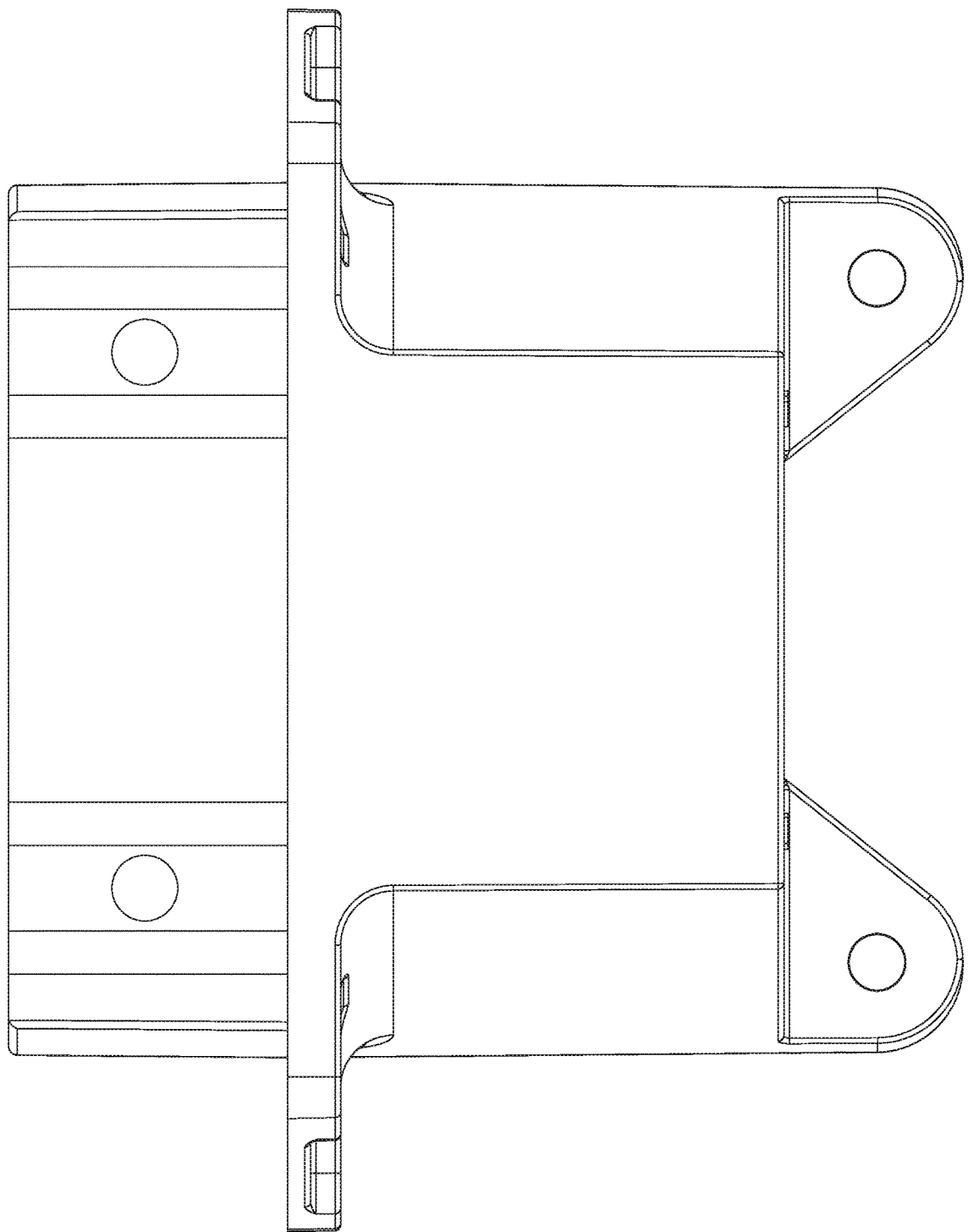
Figure 20:
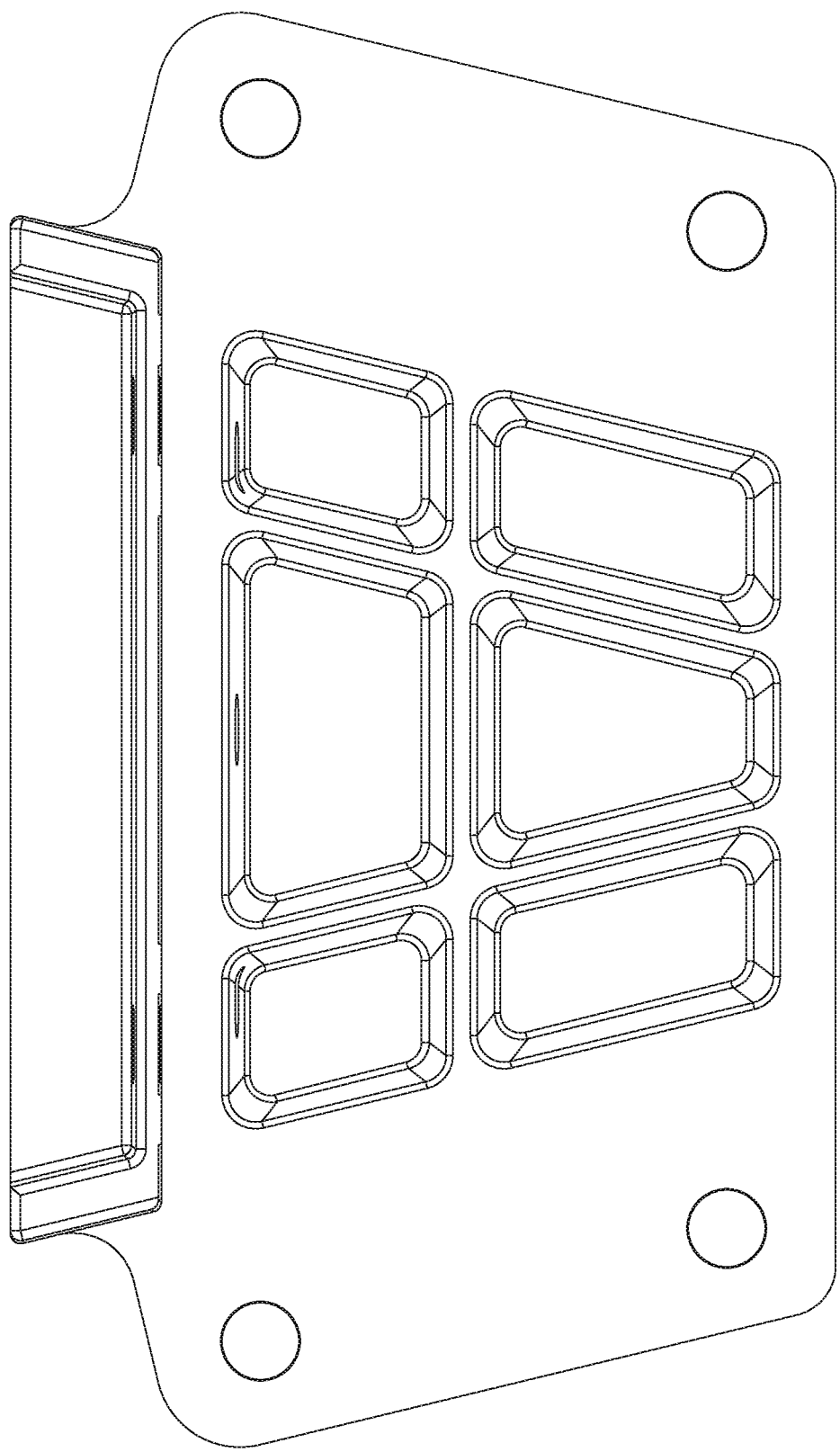
Figure 21:
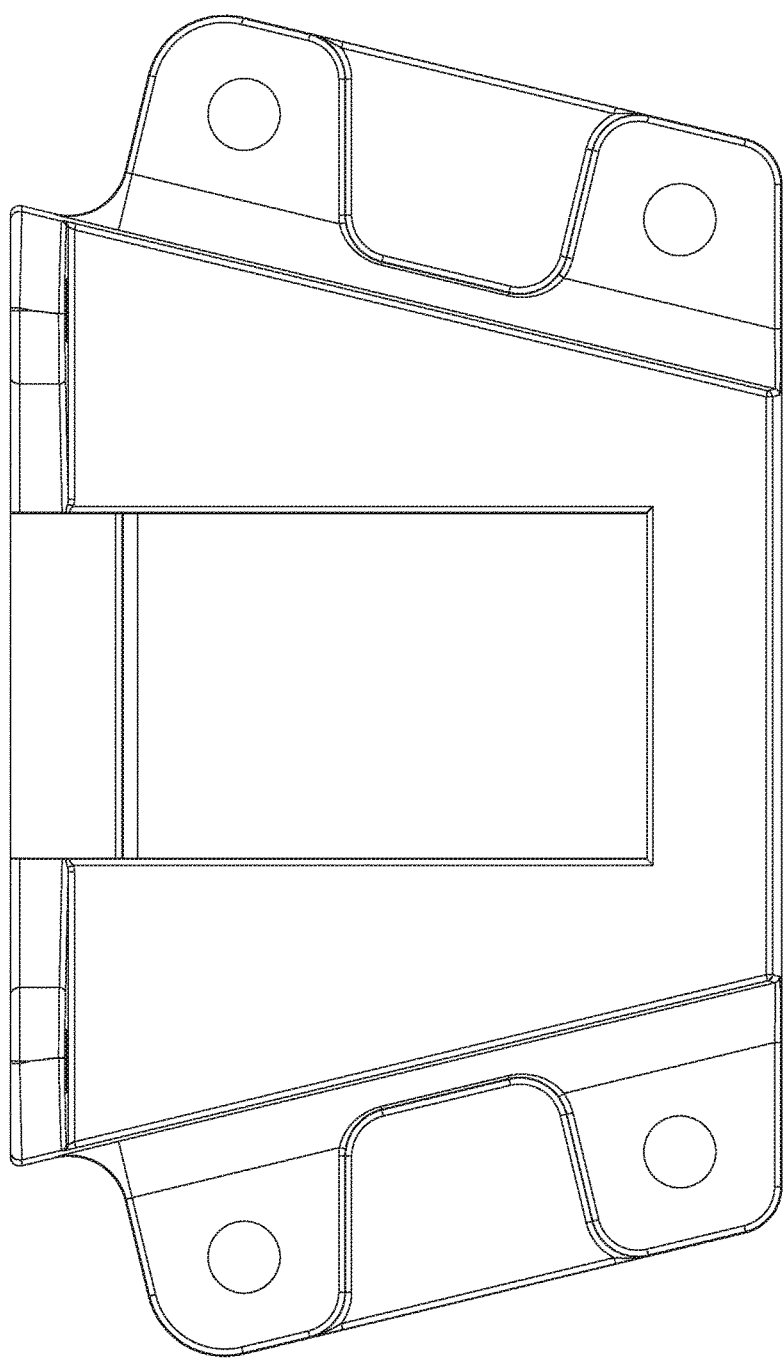

FIG. 6 shows another example modular system 100 with brackets 500, 502 engaged with brackets 512, 514 and brackets 504, 506 engaged with brackets 522, 524, in accordance with various aspects of the present disclosure.

FIGS. 7-14 show various views of example brackets having a male portion, in accordance with various aspects of the present disclosure. In addition to facilitating a description of functional aspects, the views shown in FIGS. 7-14 also illustrate the ornamentally of the male portions, according to various embodiments.

FIGS. 15-22 show various views of example brackets having a female portion, in accordance with various aspects of the present disclosure. In addition to facilitating a description of functional aspects, the views shown in FIGS. 15-22 also illustrate the ornamentally of the female portions, according to various embodiments.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A modular system for connecting a first support and a second support, the system comprising:
    a first bracket arranged on the first support and including an upper portion formed by ribs extending between a perimeter of the upper portion with lowered portions between the ribs and a male portion extending at an angle downwardly from the upper portion including a plurality of ribs extending along a surface of the male portion, the ribs of the upper portion including at least two rows with open areas between the at least two rows and the at least two rows includes a first row with open areas of a first size and a second row of open areas of a second size different than the first size; and
    a second bracket arranged on an upper surface of the second support and including a nesting portion having sidewalls configured to at least partially surround the upper portion of the first bracket and a female portion having sidewalls configured to receive and at least partially surround the male portion to connect the first support and the second support and form a substantially planar upper surface across the first bracket and the second bracket configured to support a table top or desktop above the upper surface of the second support.

2. The system of claim 1, wherein the upper portion is a substantially planar portion, and the male portion extends from the substantially planar portion.

3. The system of claim 2, wherein the angle that the male portion extends at is an obtuse angle from the substantially planar portion.

4. The system of claim 2, wherein the female portion of the second bracket extends from the nesting portion.

5. The system of claim 1, wherein upper portions of the sidewalls of the nesting portion and the substantially planar portion are configured to form the substantially planar upper surface across the first bracket and the second bracket.

6. The system of claim 2, wherein the ribs are configured to structurally stabilize the first bracket.

7. The system of claim 1, wherein the sidewalls of the second bracket include an opening for extension of the first support therethrough when the second bracket and the first bracket are engaged.

8. The system of claim 1, wherein the substantially planar upper surface formed across the first bracket and the second bracket is substantially planar with at least one of the first support and the second support.

9. The system of claim 1, wherein the first bracket includes one or more guides configured to visually indicate securement locations for attachment mechanisms configured to mechanically secure the first bracket to the second support.

10. The system of claim 1, wherein the first support and the second support are portions of one of a bench, work bench, workstation, desk, furniture, table, and frame.

11. The system of claim 1, further comprising a third bracket arranged on a third support and including a male portion, and a fourth bracket arranged on the second support and including a female portion configured to receive the male portion of the third bracket.

12. The system of claim 11, wherein the fourth bracket is integral with the second bracket.

13. A modular system comprising:
    a transverse support;
    a first support horizontally extending between and coupled to a first pair of legs;
    a second support horizontally extending between and coupled to a second pair of legs;
    a first male bracket arranged on a first end of the transverse support and including a first upper portion formed by ribs extending between a perimeter of the upper portion with lowered portions between the ribs and a first male portion extending at an angle downwardly from the first upper portion and a second male bracket arranged on a second end of the transverse support and including a second upper portion formed by ribs extending between a perimeter of the upper portion with lowered portions between the ribs and a second male portion extending at an angle downwardly from the second upper portion including a plurality of ribs extending along a surface of the male portion, the ribs of the upper portion including at least two rows with open areas between the at least two rows and the at least two rows includes a first row with open areas of a first size and a second row of open areas of a second size different than the first size; and
    a first female bracket arranged on an upper surface of the first support and having a first nesting portion having sidewalls configured to at least partially surround the first upper portion of the first male bracket and a first female portion having sidewalls and a second female bracket arranged on the second support and having a second nesting portion having sidewalls configured to at least partially surround the second upper portion of the second male bracket and a second female portion having sidewall, the sidewalls of the first female bracket are configured to receive and at least partially surround the first male portion of the first male bracket and the second female bracket are configured to receive and at least partially surround the second male portion of the second male bracket form a substantially planar surface across the transverse support configured to support a table top or desktop above the upper surface of the second support.

14. The system of claim 13, wherein the first female bracket being configured to receive the first male bracket and the second female bracket being configured to receive the second male bracket form a substantially planar surface across the first support and a substantially planar surface across the second support.

15. The system of claim 13, wherein the first male bracket is configured to nest within the first female bracket and the second male bracket is configured to nest within the second female bracket.

16. A method of connecting a first support and a second support of a modular system, the method comprising:
    arranging a first bracket having an upper portion formed by ribs extending between a perimeter of the upper portion with lowered portions between the ribs and a male portion extending at an angle downwardly from the upper portion including a plurality of ribs extending along a surface of the male portion, the first bracket being arranged on the first support and a second bracket having a nesting portion with sidewalls and a female portion with sidewalls arranged on an upper surface of the second support, the ribs of the upper portion including at least two rows with open areas between the at least two rows and the at least two rows includes a first row with open areas of a first size and a second row of open areas of a second size different than the first size; and
    positioning the upper portion of the first bracket within the nesting portion of the second bracket with the sidewalls of the nesting portion at least partially surrounding the upper portion and positioning the male portion of the first bracket within the female portion of the second bracket with the sidewalls of the female portion at least partially surrounding the male portion of the first bracket to connect the first support and the second support and form a substantially planar upper surface across the first bracket and the second bracket configured to support a table top or desktop above the upper surface of the second support.

17. The method of claim 16, wherein positioning the first bracket within the second bracket includes at least partially surround a substantially planar portion of the first bracket with the second bracket.

\* \* \* \* \*